(12) United States Patent
Frye et al.

(10) Patent No.: US 11,714,248 B2
(45) Date of Patent: Aug. 1, 2023

(54) HIGH DENSITY BUNDLED OPTICAL FIBER CABLE WITH PRECONNECTORIZED DROP POINTS

(71) Applicant: CORNING RESEARCH & DEVELOPMENT CORPORATION, Corning, NY (US)

(72) Inventors: Ryan Everette Frye, Newton, NC (US); Corey Scott Keisler, Conover, NC (US); James Arthur Register, III, Hickory, NC (US); Benjamin Gray Whitener, Newton, NC (US); Christopher L. Willis, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/726,917

(22) Filed: Apr. 22, 2022

(65) Prior Publication Data

US 2022/0252816 A1      Aug. 11, 2022

Related U.S. Application Data

(63) Continuation of application No. 17/122,012, filed on Dec. 15, 2020, now Pat. No. 11,320,620, which is a
(Continued)

(51) Int. Cl.
*G02B 6/00*      (2006.01)
*G02B 6/44*      (2006.01)
*G02B 6/38*      (2006.01)

(52) U.S. Cl.
CPC ......... *G02B 6/4471* (2013.01); *G02B 6/3897* (2013.01); *G02B 6/4432* (2013.01)

(58) Field of Classification Search
CPC .. G02B 6/4471; G02B 6/3897; G02B 6/4432; G02B 6/4413; G02B 6/00
See application file for complete search history.

(56) References Cited

U.S. PATENT DOCUMENTS 4,505,541 A    3/1985    Considine et al.
4,874,219 A    10/1989   Arroyo et al.
(Continued)

OTHER PUBLICATIONS

European Patent Application No. 19825921.0, Extended European search report, dated Feb. 22, 2022; 10 pages; European Patent Office.
(Continued)

*Primary Examiner* — Jennifer Doan
(74) *Attorney, Agent, or Firm* — William D. Doyle

(57) ABSTRACT

Embodiments of a bundled optical fiber cable are provided. Included therein is a central cable unit spanning a first length from a first end to a second end. The central cable unit has a first plurality of optical fibers disposed within a cable jacket. The bundled optical fiber cable also includes at least one optical fiber drop cable wound around the cable jacket of the central cable unit. Each optical fiber drop cable spans a second length from a first end to a second end. Further, each optical fiber drop cable includes one or more optical fibers disposed within a buffer tube. The first end of each optical fiber drop cable is substantially coterminal with the first end of the central cable unit, and the first length spanned by the central cable unit is longer than the second length spanned by each of the optical fiber drop cables.

17 Claims, 9 Drawing Sheets

Related U.S. Application Data continuation of application No. PCT/US2019/038876, filed on Jun. 25, 2019.

(60) Provisional application No. 62/722,307, filed on Aug. 24, 2018, provisional application No. 62/690,089, filed on Jun. 26, 2018.

(56) References Cited

U.S. PATENT DOCUMENTS

| | | | |
|---|---|---|---|
| 5,016,973 | A | 5/1991 | Hager et al. |
| 5,230,033 | A | 7/1993 | Soodak |
| 6,233,384 | B1 | 5/2001 | Sowell et al. |
| 6,236,789 | B1 | 5/2001 | Fitz |
| 7,127,143 | B2 | 10/2006 | Elkins et al. |
| 7,190,866 | B2 | 3/2007 | Greenwood et al. |
| 7,203,404 | B2 | 4/2007 | Greenwood et al. |
| 7,242,841 | B2 | 7/2007 | Greenwood et al. |
| 7,272,282 | B1 | 9/2007 | Seddon et al. |
| 7,272,283 | B2 | 9/2007 | Temple, et al. |
| 7,555,181 | B2 | 6/2009 | Temple, et al. |
| 7,609,923 | B2 | 10/2009 | Baucom et al. |
| 7,705,241 | B2 | 4/2010 | Steward et al. |
| 7,885,501 | B2 | 2/2011 | Patlakh |
| 7,927,025 | B2 | 4/2011 | Ohtsuka et al. |
| 7,941,021 | B2 | 5/2011 | Cody et al. |
| 8,989,543 | B2 | 3/2015 | Homma et al. |
| 9,116,322 | B1 | 8/2015 | Laws |
| 9,475,239 | B2 | 10/2016 | Abernathy et al. |
| 9,893,812 | B2 * | 2/2018 | Boxer .............. H04B 10/25753 |
| 11,320,620 | B2 * | 5/2022 | Frye ..................... G02B 6/4471 |
| 2002/0122640 | A1 | 9/2002 | Strong et al. |
| 2004/0081413 | A1 | 4/2004 | Bocanegra et al. |
| 2008/0193091 | A1 | 8/2008 | Herbst |
| 2011/0211794 | A1 | 9/2011 | Ruzzier et al. |
| 2013/0139436 | A1 | 6/2013 | Pripps |
| 2014/0241680 | A1 | 8/2014 | Cody et al. |
| 2017/0031121 | A1 | 2/2017 | Blazer et al. |
| 2018/0120530 | A1 * | 5/2018 | Compton ............. G02B 6/4495 |
| 2018/0224619 | A1 | 8/2018 | Debban et al. |

OTHER PUBLICATIONS

International Search Report and Written Opinion of the International Searching Authority; PCT/US19/038876; dated Sep. 23, 2019; 6 Pages; Commissioner for Patents.

* cited by examiner

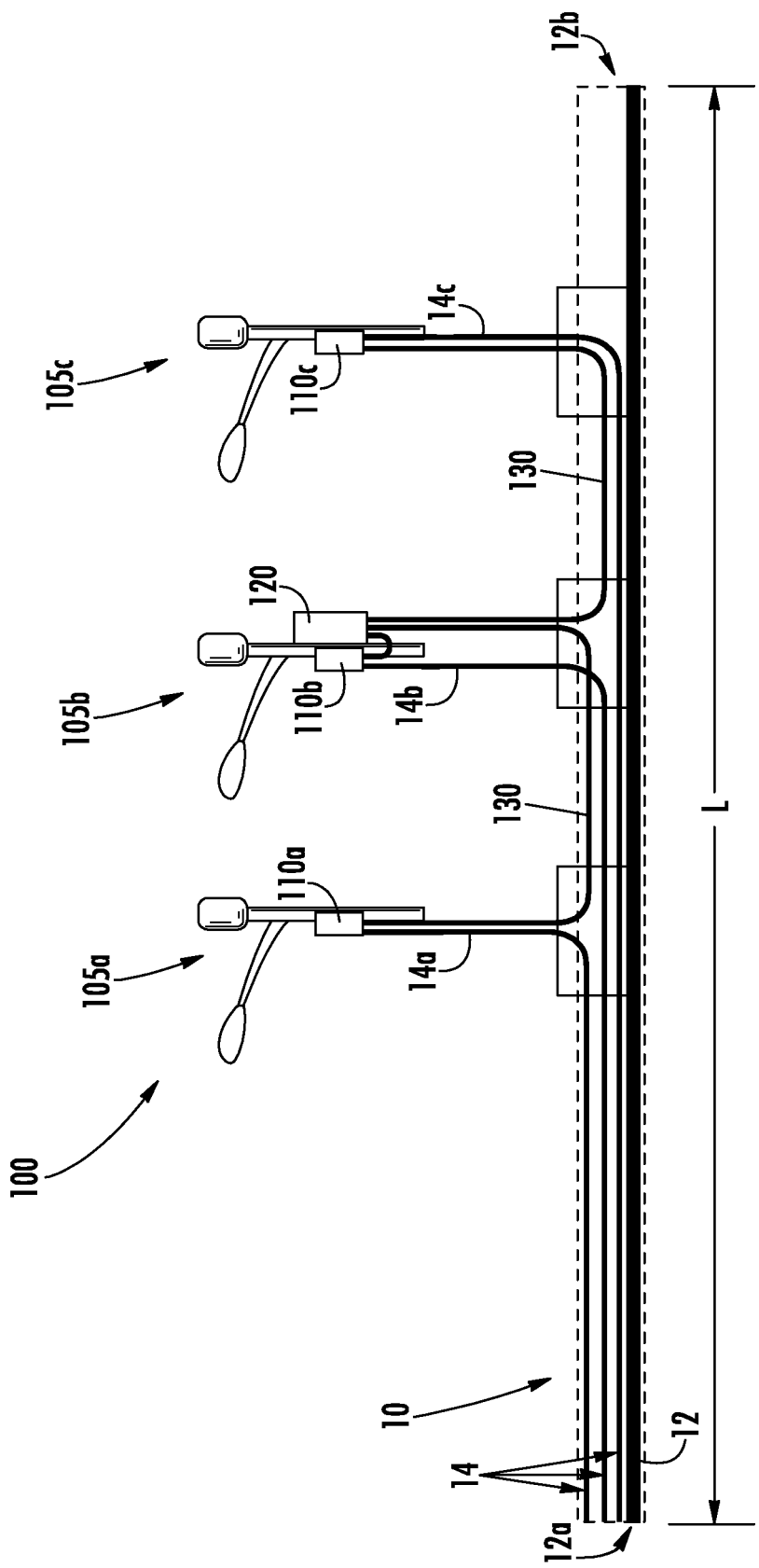

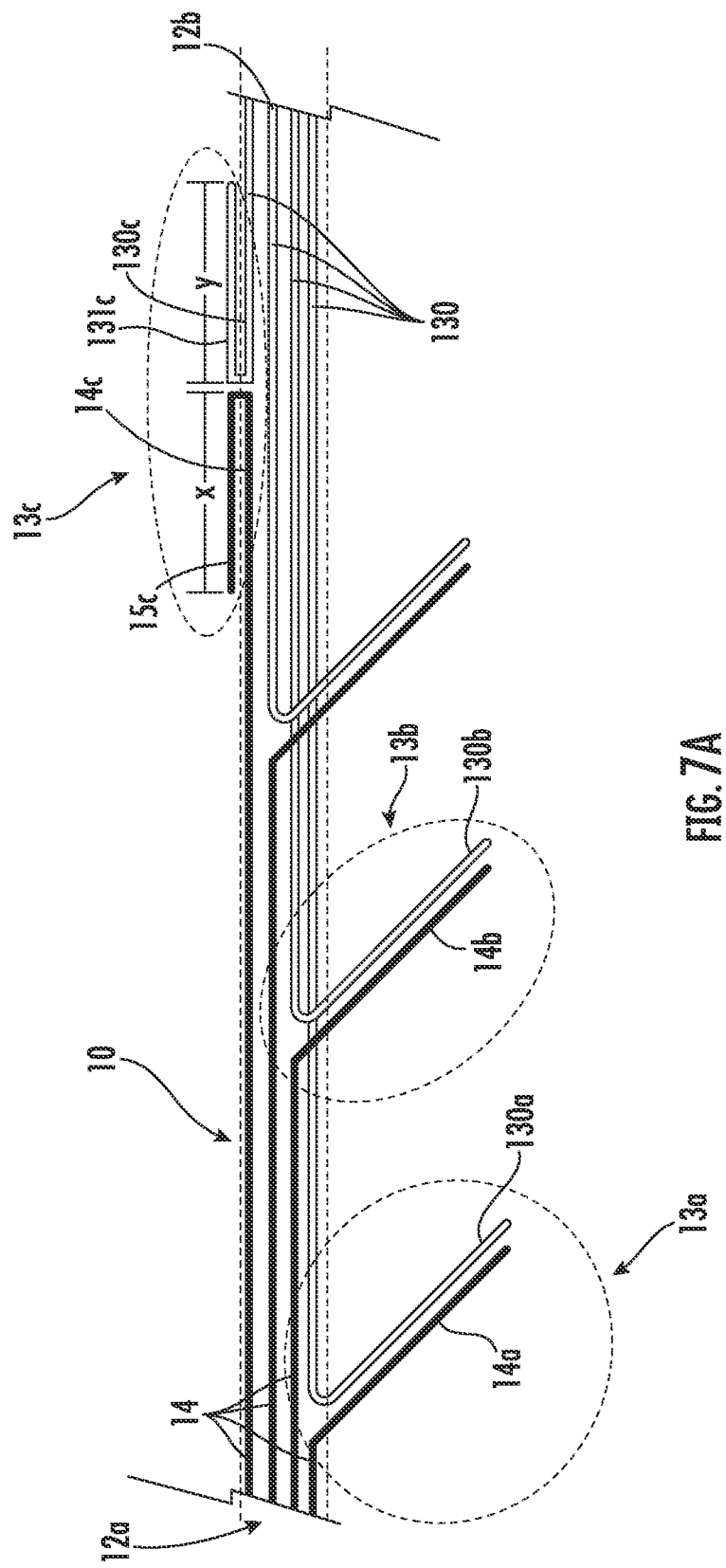

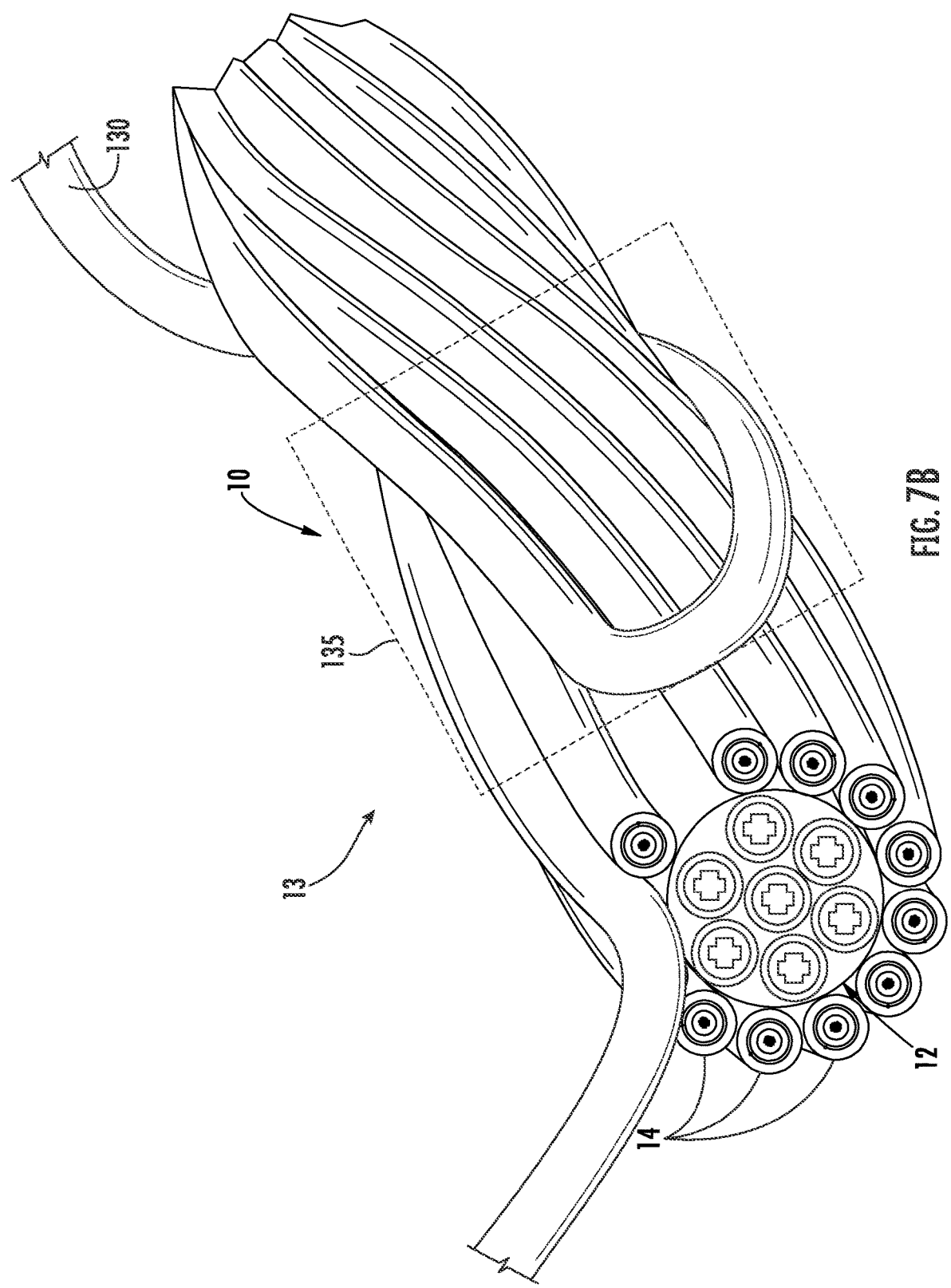

HIGH DENSITY BUNDLED OPTICAL FIBER CABLE WITH PRECONNECTORIZED DROP POINTS

PRIORITY APPLICATION

This application is a continuation of U.S. application Ser. No. 17/122,012, filed Dec. 15, 2020, which is a continuation of International Application No. PCT/US2019/038876 filed on Jun. 25, 2019, which claims the benefit of priority to U.S. Application No. 62/690,089, filed on Jun. 26, 2018, and U.S. Application No. 62/722,307, filed on Aug. 24, 2018, the content of each of which is relied upon and incorporated herein by reference in their entirety.

BACKGROUND

The disclosure relates generally to optical fiber cables and more particularly to optical fiber cables that have drop cables that run along at least a portion of the length of a main distribution cable. Optical fiber cables are used to transmit data over distance. Generally, large distribution cables that carry a multitude of optical fibers from a hub are sub-divided at network nodes, which are further sub-divided, e.g., to the premises of individual subscribers. Generally, these subdivisions involve splicing a cable tether into a main distribution line. Cable splicing at specific locations along a main distribution line is a delicate and time consuming process that requires precise placement of the cable tether and that involves the risks of cutting the wrong fibers and providing environmental exposure to the cable interior.

SUMMARY

In one aspect, embodiments of the disclosure relate to a bundled optical fiber cable. The bundled optical fiber cable includes a central cable unit spanning a first length from a first end to a second end. The central cable unit has a first plurality of optical fibers disposed within a cable jacket. The bundled optical fiber cable also includes at least one optical fiber drop cable wound around the cable jacket of the central cable unit. Each of the at least one optical fiber drop cable spanning a second length from a first end to a second end. Further, each of the at least one optical fiber drop cable includes one or more optical fibers disposed within a buffer tube. The first end of each of the at least one optical fiber drop cable is substantially coterminal with the first end of the central cable unit, and the first length spanned by the central cable unit is longer than the second length spanned by each of the at least one optical fiber drop cable.

In another aspect, embodiments of the disclosure relates to a method of preparing a bundled optical fiber cable. In the method, a central cable unit having a first end and a second end is provided. The central cable unit includes a first plurality of optical fibers disposed within a cable jacket. Further, at least one optical fiber drop cable is wound around the cable jacket of the central cable unit beginning at the first end and ending prior to reaching the second end. Each of the at least one optical fiber drop cable comprises one or more optical fibers disposed within a buffer tube.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 7 depicts an exemplary deployment for the bundled optical cable including electrical drop cables, according to an exemplary embodiment.

FIG. 7A depicts an exemplary bundled optical cable including electrical drop cables, in accordance with aspects of the present disclosure.

FIG. 7B depicts an exemplary bundled optical cable including an electrical drop cable, in accordance with aspects of the present disclosure.

DETAILED DESCRIPTION

Referring generally to the figures, various embodiments of a bundled optical fiber cable are provided. The bundled optical fiber cable includes a central cable unit and at least one drop cable wound around the distribution cable. Unlike other cable tethers, the drop cables of the bundled optical fiber cable are not spliced into the central cable unit. That is, the central cable unit and each drop cable run in parallel from each of their starting ends until each drop cable reaches its predetermined drop point. In this way, the central cable unit acts as an "express line" for transmitting data from node to node, and each drop cable provides data to a particular delivery point along the length of the cable between nodes. Various exemplary embodiments of a bundled optical fiber cable are described herein; however, these exemplary embodiments should be considered illustrative and non-limiting.

Figure 1:
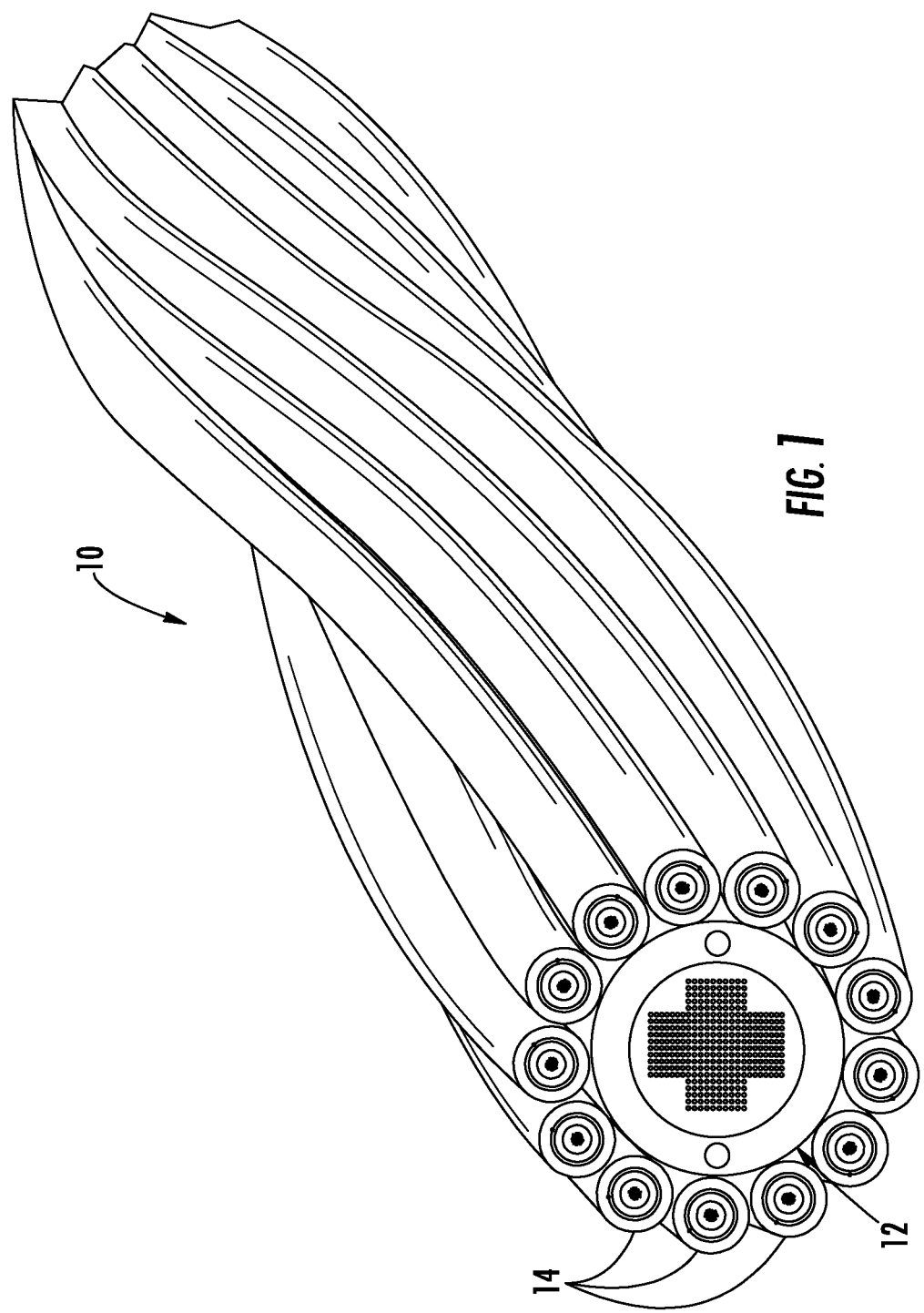
FIG. 1 depicts partial perspective view of a bundled optical cable, according to an exemplary embodiment.

FIG. 1 depicts an embodiment of a bundled optical fiber cable 10 in a partial sectional view taken over a portion of the length of the bundled optical fiber cable 10. As can be seen, the bundled optical fiber cable 10 includes a central cable unit 12 and a plurality of drop cables 14 that are wound around the outside of the central cable unit 12. In embodiments, the drop cables 14 are helically wound around the central cable unit 12. For example, in embodiments, the drop cables 14 may have an S winding or a Z winding around the central cable unit 12. Additionally, in embodiments, the drop cables 14 may have an SZ winding around the central cable unit 12.

Figure 2:
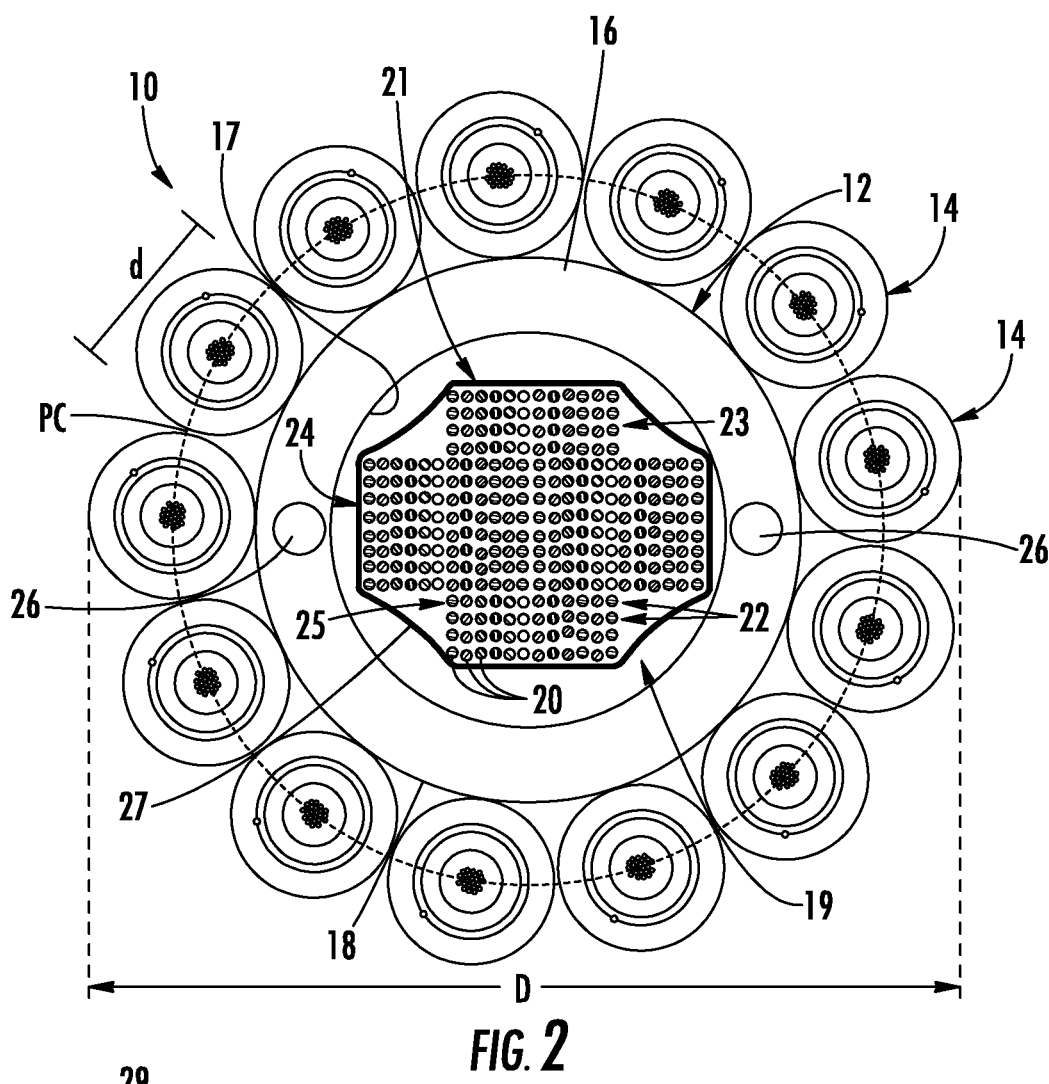
FIG. 2 depicts a cross-sectional view of the bundled optical cable of FIG. 1.
Figure 8:
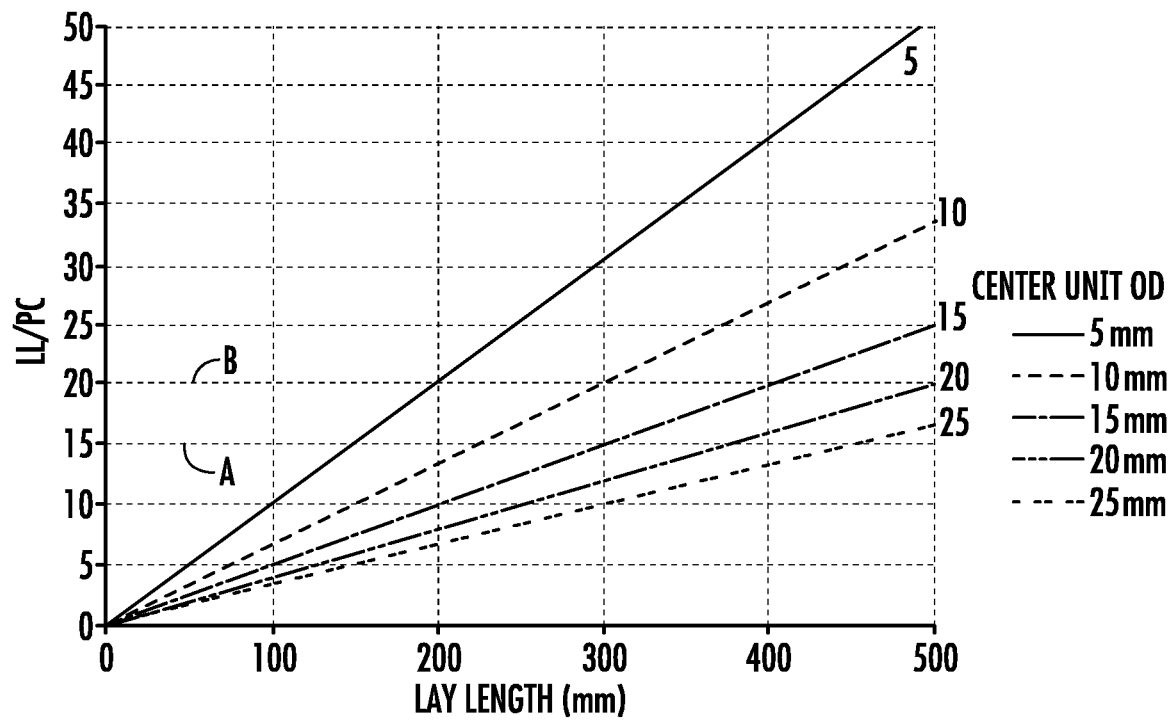
FIG. 8 is a graph of laylength plotted against the ratio between laylength and pitch circle for bundled optical fiber cables having various central cable unit diameters.

In embodiments, the drop cables 14 are held to the central cable unit 12 only via the winding, which allows the drop cables 14 some degree of movement longitudinally along the length of the central cable unit 12 during bending of the bundled optical fiber cable 10. In embodiments, the laylength of the winding (i.e., the length required for the drop cable 14 to make a complete revolution around the central cable unit 12) is a function of the ratio between the laylength LL and a pitch circle PC (as shown in FIG. 2). With reference to FIG. 2, the pitch circle runs through the center of each drop cable 14 and, thus, has a diameter extending from the center of a first drop cable 14 to the center of a second drop cable 14 directly opposite the first drop cable 14. Therefore, the diameter of the pitch circle is equal to the outer diameter D bundled optical fiber cable 10 minus the outer diameter d of one drop cable 14. In embodiments, the laylength of the drop cables 14 is selected such that the ratio LL/PC is 20 or less. In other embodiments, the laylength of the drop cables 14 is selected such that the ratio LL/PC is 17.5 or less, and in still other embodiments, the laylength is selected such that the ratio LL/PC is 15 or less. FIG. 8 depicts a chart showing the laylength and ratio LL/PC for a variety of bundled optical fiber cables 10 having central cable units 12 with outer diameters of from 5 mm to 25 mm. In the exemplary embodiments considered in FIG. 8, each of the central cable units 12 were considered using drop cables having an outer diameter of 4.8 mm. Line A is located at a ratio LL/PC of 15, and line B is located at a ratio LL/PC of 20. As can be seen, the maximum allowable laylength while remaining under a given ratio LL/PC increases as the central cable unit OD increases. Thus, for example, a bundled optical fiber cable 10 having a central cable unit 12 with a 5 mm outside diameter can have a laylength of about 150 mm for an LL/PC of 15 or of about 200 mm for an LL/PC of 20. A lower laylength corresponds to tighter coils of the drop cables 14 around the central cable unit 12, which increases the length of the drop cables 14 necessary for a given length of the central cable unit. Further, processing line speed is slower at lower laylengths because of the tighter coiling. Thus, in embodiments, the laylength is maintained close to the allowable LL/PC ratio to reduce extra fiber length and to maintain a higher processing line speed.

In embodiments, bands are placed at various intervals along the length of the bundled optical fiber cable 10 to keep the drop cables 14 wrapped around the central cable unit 12. In certain embodiments, the bands are welded polyethylene bands. In another embodiment, webbing, such as a polyethylene web ribbon, is provided around the drop cables 14 to keep the drop cables 14 wrapped around the central cable unit 12.

As will be appreciated from the discussion provided later herein, in embodiments, the drop cable 14 each have different lengths and run only so far as to reach their desired drop location. The central cable unit 12 spans at least as long as the longest drop cable 14. However, each of the drop cables 14 and the central cable unit 12 has substantially the same beginning point. Put differently, each of the drop cables and the central cable unit 12 begin at the substantially the same location but end at different locations, thereby causing the drop cables 14 and the central cable unit 12 to span different cable lengths. As discussed herein, the "span" length of the drop cables 14 refers to the distance over which the drop cable 14 is able to run from its beginning location to its ending location and not to the actual length of the drop cable 14 itself. That is because, in embodiments, winding the drop cable 14 around the central cable unit 12 will make the actual length of the drop cable 14 longer than the span length.

FIG. 2 provides a detailed cross-sectional view of the bundled optical fiber cable 10. As can be seen, the drop cables 14 are substantially evenly spaced around the circumference of central cable unit 12. In the embodiment depicted, there are thirteen drop cables 14. In embodiments, as few as a single drop cable 14 can be provided around the central cable unit 12. In other embodiments, as many as twenty-four drop cables 14 can be provided around the central cable unit 12. Further, as will be discussed more fully below, the drop cables do not all need to contain optical fibers. For example, in embodiments, the drop cables can be "dummy cables" that do not contain any data or electrical transmission element but which provide structural support around the cable. Additionally, the drop cables can include electrical transmission elements, such as wires.

In general, the number of drop cables 14 that can be provided around the central cable unit 12 depends on size of drop cables 14, size of the central cable unit 12, and any external limiting factors for overall size (e.g., a 2" duct which houses the bundled optical fiber cable 10). In an exemplary embodiment, the central cable unit 12 has an outer diameter of 20 mm, and the drop cables 14 each have an outer diameter d of 4.8 mm. In this exemplary embodiment, fifteen drop cables 14 are able to fit around the central cable unit 12. The outer diameter D of the bundled optical fiber cable 10 according to this exemplary embodiment is approximately 30 mm. Considering other components of the cable, such as the connectors for the drop cables 14 and any protective covers to hold the connectors to the bundled optical fiber cable 10, this exemplary embodiment would provide a fill ratio of about 85% for a 2" circular duct. In general, the size of the bundled optical fiber cable 10, including the number of drops 14, is only limited based on the size of the equipment used for installing the bundled optical fiber cable 10 and the available duct space for carrying the bundled optical fiber cable 10. Thus, for example, a 30 mm center cable unit 12 with twenty drop cables 14 could be carried in a 3" duct. With respect to available duct space, in embodiments, the diameter D of the bundled optical fiber cable 10 is configured such that the cross-sectional area of the bundled optical fiber cable 10 at its widest point is no more than 85% of the cross-section area of the duct into which the bundled optical fiber cable 10 is installed.

As used herein, the diameter D referenced with respect to the embodiment of FIG. 2 refers to the diameter of a hypothetical circle defined by the outermost extents of the drop cables 14. As viewed from the cross-section of FIG. 2, the bundled optical fiber cable 10 is defined by a larger, central circle surrounded by smaller, outer circles. Thus, the actual outermost surface of the bundled optical fiber cable 10 undulates moving from drop cable 14 to drop cable 14 around the circumference. Accordingly, the actual cross-ssectional width of the bundled optical fiber cable 10 varies at different positions measured around the circle.

Referring now to the structure of the bundled optical fiber cable 10 as shown in FIG. 2, the central cable unit 12 includes a cable jacket 16 having an inner surface 17 and an outer surface 18. The inner surface 18 defines a cable bore 19 within which a plurality of optical fibers 20 are disposed. The optical fibers 20 can be arranged in a variety of suitable ways within the central cable unit 12. In the embodiment depicted, the optical fibers 20 are arranged in a stack 21 of multiple ribbons 22. In particular, the optical fibers 20 are arranged into a stack 21 of sixteen ribbons 22 having a plus-shaped cross-section. The sixteen ribbons 22 include an upper stack section 23, a middle stack section 24, and a lower stack section 25. In embodiments, the upper stack section 23 and the lower stack section 25 contain the same number of optical fibers 20 and/or ribbons 22. Also, in embodiments, the middle stack section 24 includes at least twice the number of optical fibers 20 per ribbon 22 as compared to the upper stack section 23 and/or the lower stack section 25. Further, in embodiments, the middle stack section includes as least twice as many ribbons 22 as compared to the upper stack section 23 and/or the lower stack section 25. In an exemplary embodiment shown in FIG. 2, the upper stack section 23 and the lower stack section 25 each have four ribbons 22 of twelve optical fibers 20. The middle stack section 24 in the embodiment depicted has eight ribbons 22 of twenty-four optical fibers 20. Thus, in the embodiment depicted, the total number of optical fiber 20 is 288. In embodiments, a single stack can contain up to 864 optical fibers 20. As shown in FIG. 2, the stack 21 is surrounded by a stack jacket 27, which, in embodiments, may provide color coding for multiple-stack configurations (discussed below) and/or water-blocking properties.

In embodiments, multiple stacks 21 can be provided in the cable bore 19. In an exemplary embodiment, the cable bore 19 contains six stacks 21 of 288 optical fibers 20 for a total of 1728 optical fibers 20. In another embodiment, the cable bore 19 contains twelve stacks 21 of 288 optical fibers 20 for a total of 3456 optical fibers 20. In embodiments having multiple stacks 21, the stacks 21 may be wound around a central strengthening member, such as a glass-reinforced plastic member. As will be understood, the number of optical fibers 20 provided in the central cable unit 12 has a bearing on the overall size of the bundled optical fiber cable 10. Thus, the number of optical fibers 20 that can be included in the central cable unit 12 may be dictated by the particular installation parameters. Central cable units of the type described are available from Corning Incorporated, Corning, N.Y., such as those marketed under the trademark Rocket-Ribbon™.

Moreover, while FIG. 2 depicts the optical fibers 20 arranged in ribbons 22 that are further arranged into stacks 21, the cable bore 19 could instead include a plurality of loose optical fibers 20 or a plurality of optical fibers 20 grouped into multiple buffer tubes. In the latter embodiment, the optical fibers 20 in the buffer tubes can, for example, be arranged in ribbons 22, or the optical fibers 20 can, for example, be in a loose tube configuration. Further, each buffer tube can contain the same or a different number of optical fibers 20. Central cable units 12 of the type described in this paragraph are available from Corning Incorporated, Corning, N.Y., such as those marketed under the trademarks ALTOS®, SST-Ribbon™, and SST-UltraRibbon™. Additionally, in embodiments, the central cable unit 12 is configured to have a small diameter D for installation in small ducts (e.g., 2" or less). Such central cable units 12 of this type are available from Corning Incorporated, Corning, N.Y. under the trademark MiniXtend®.

As can also be seen in the embodiment of FIG. 2, the cable jacket 16 includes two strength members 26. In embodiments, each strength member 26 is made of glass-reinforced plastic or metal. Further, while two strength members 26 are depicted, embodiments of the central cable unit 12 can include no strength members 26 or up to four strength members 26. In embodiments, an additional toning member may be embedded in the cable jacket 16 along with the strength members 26. The toning member is selected to be metal to allow for cable location via toning, which is a technique where a signal is sent over the toning member of a buried optical fiber cable such that the signal can be detected above ground for the purpose of locating the optical fiber cable.

Figure 3:
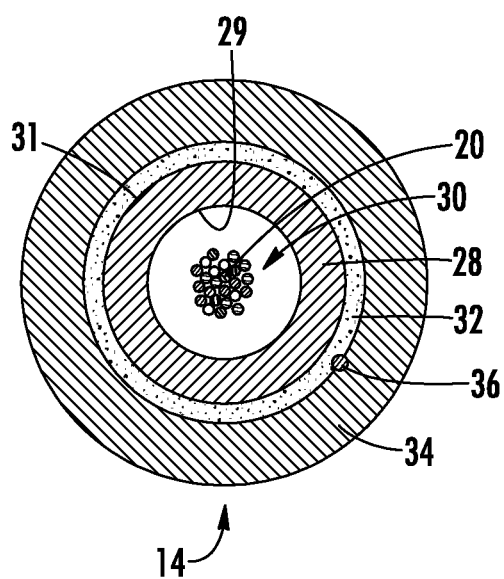
FIG. 3 depicts a detail view of a drop cable, according to an exemplary embodiment.

FIG. 3 depicts an embodiment of a drop cable 14. In the embodiment depicted in FIG. 3, the drop cable 14 is a loose tube cable in which the optical fibers 20 are contained in a buffer tube 28. The buffer tube 28 has an interior surface 29 defining a bore 30 in which the optical fibers 20 are contained, and the buffer tube 28 has an exterior surface 31 around which strengthening yarns 32 may optionally be wound. The drop cable 14 also includes a jacket 34 around the buffer tube 28. In embodiments, a ripcord 36 is embedded in the jacket 34 to provide access to the interior of the drop cable 14.

In the embodiment shown in FIG. 3, the drop cable 14 includes twenty-four optical fibers 20. However, the drop cable 14 can include, e.g., from one optical fiber 22 up to thirty-six optical fibers 20 in embodiments depending on the particular needs of the installation. Further, the drop cable 14 depicted in FIG. 3 is a loose tube cable. In other embodiments, the optical fibers 20 are arranged in one or more ribbons within the buffer tube 28. In a particular embodiment shown in FIG. 4, the optical fibers 20 are arranged in a rollable ribbon 38. In such embodiments, the optical fibers 20 are joined with a web or matrix material that allows the optical fibers 20 to be rolled or bent into a variety of different positions. Rollable ribbons of the type suitable for use as a drop cable 14 are described in U.S. Publication No. 2017/0031121, published on Feb. 2, 2017, for application Ser. No. 15/216,757, filed on Jul. 22, 2016, the contents of which are incorporated herein by reference in their entirety. Rollable ribbons 38 provide the ability to splice multiple fibers in a single process along with the ability to fit the rollable ribbon 38 in a smaller buffer tube 28.

Figure 4:
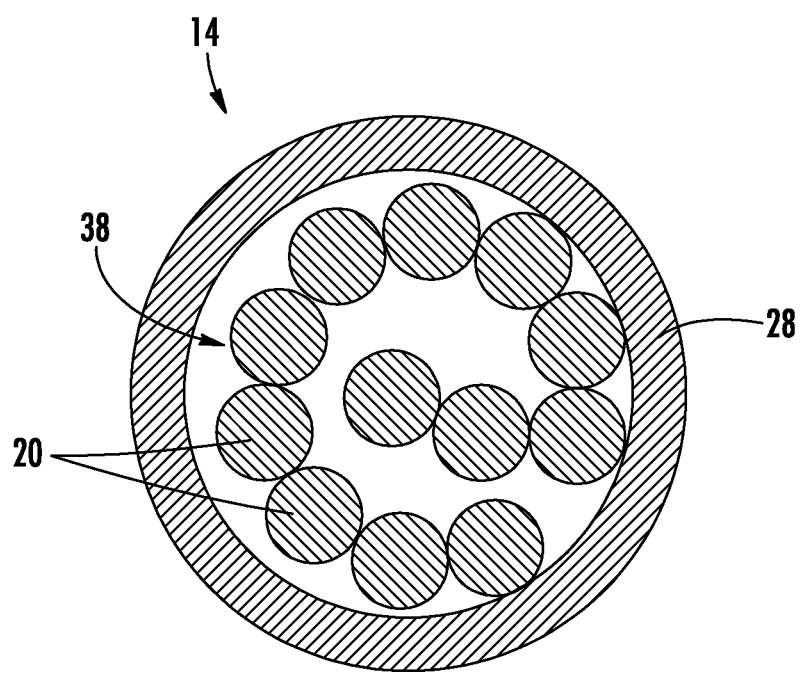
FIG. 4 depicts a rolled-ribbon drop cable, according to an exemplary embodiment.

The bundled optical fiber cable 10 as shown in FIG. 2 can include a variety of different drop cables 14 wound around the central cable unit 12, including at least one drop cable 14 as shown in FIG. 3, at least one drop cable 14 as shown in FIG. 4, and/or at least one drop cable of a variety of other types described herein or known to those of ordinary skill in the art.

Figure 5:
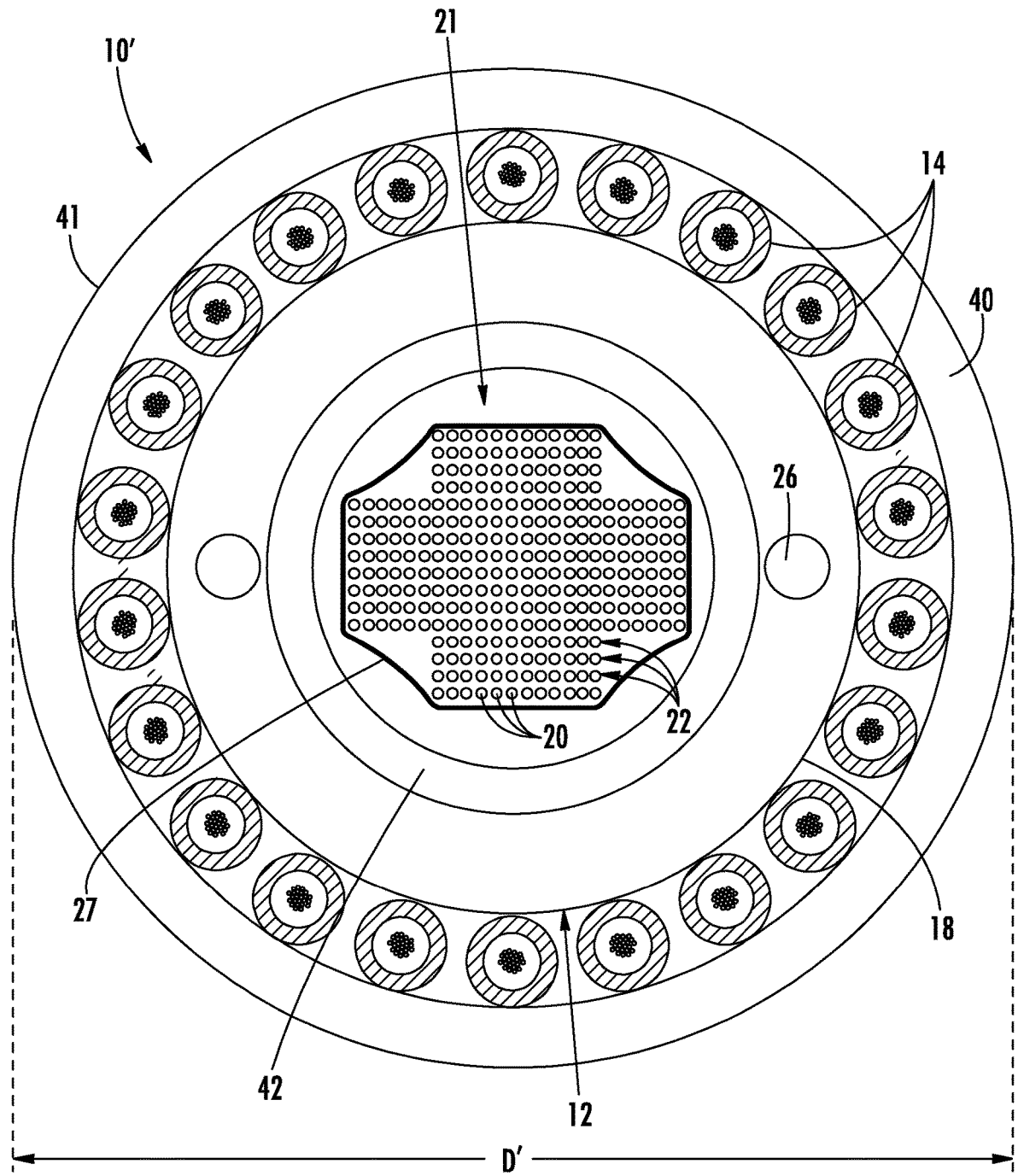
FIG. 5 depicts a cross-sectional view of another embodiment of a bundled optical cable, according to an exemplary embodiment.

FIG. 5 depicts another embodiment of a bundled optical fiber cable 10'. In the embodiment of FIG. 5, the central cable unit 12 is surrounded by a plurality of drop cables 14 that are further surrounded by a bundle jacket 40. The exterior surface 41 of the bundle jacket 40 defines the outer extent of the bundled optical fiber cable 10' and thus a diameter D' of the bundled optical fiber cable 10'. As can be seen in FIG. 5, the central cable unit 12 is substantially similar to the central cable unit 12 shown in FIG. 2 in that the central cable unit 12 of FIG. 5 includes optical fibers 20 arranged in a stack 21 of ribbons 22. In FIG. 5, though, the stack 21 of ribbons 22 is disposed within a buffer tube 42. Further, in the embodiment of FIG. 5, the drop cables 14 are a plurality of buffer tubes 28 containing optical fibers 20. The exterior surfaces 31 of the buffer tubes 28 are in contact with the outer surface 18 of the cable jacket 16. In embodiments, the buffer tubes 28 are stranded around the central cable unit 12 in a helical winding, such as an S winding, a Z winding, or an SZ winding.

Further, as can be seen in FIG. 5, by using buffer tubes 28 as the drop cables 14, more drop cables 14 can be provided around the exterior of the central cable unit 12. In the embodiment depicted in FIG. 5, twenty-two buffer tubes 28 are provided around the central cable unit 12. The buffer tubes 28 are accessed by cutting into the bundle jacket 40 at specific access locations. In this embodiment, a buffer tube 28 is removed from the bundle jacket 40 at a desired location and then spliced into a tether cable (e.g., a FlexNAP™ system cable available from Corning Incorporated, Corning, N.Y.). Thus, while splicing is performed in this embodiment at drop locations, the bundled optical fiber cable 10' provides the advantage that the central cable unit 12 does not have to be accessed in performing the splice, thereby simplifying the splicing procedure.

The buffer tubes 28 shown in FIG. 5 are substantially similar to the buffer tubes 28 shown in FIG. 3 and, therefore, can contain, e.g., from one to thirty-six optical fibers 20. As compared to the bundled optical fiber cable 10 of FIG. 2 in which each drop cable 14 is provided with a separate drop cable jacket 34, the bundled optical fiber cable 10' of FIG. 5 allows for more buffer tubes 28 by providing a single bundle jacket 40 for all the buffer tubes 28. In this way, the bundled optical fiber cable 10' of FIG. 5 is potentially able to provide a higher optical fiber count than the bundled optical fiber cable 10 of FIG. 2 in a package that is roughly the same size, i.e., D≈D'.

Figure 6:
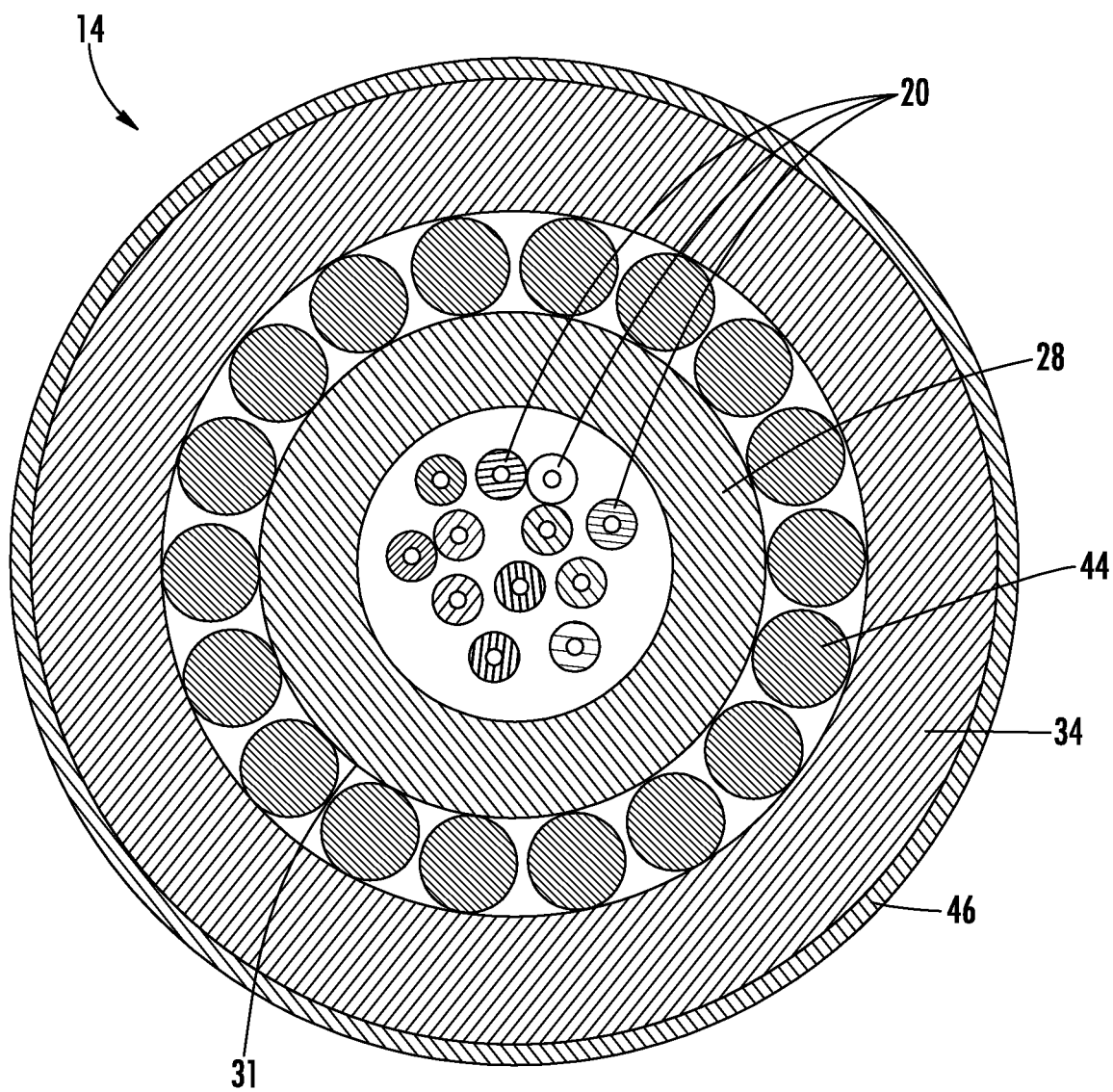
FIG. 6 depicts an exemplary embodiment of a drop cable having rodent protection, according to an exemplary embodiment.

FIG. 6 depicts an embodiment of a drop cable 14 having rodent protection. The drop cable 14 includes a plurality of optical fibers 20 disposed within a buffer tube 28. On an exterior surface 31 of the buffer tube 28, an armor layer 44 is provided. In embodiments, the armor layer 44 is a metallic tape wrapped around the buffer tube 28. In certain embodiments, the metallic tape is corrugated. In other embodiments, the armor layer 44 is stranded metal wire. In embodiments, the metal for the ribbon or wire includes at least one of steel or aluminum. The armor layer 44 is disposed within the drop cable jacket 34. In embodiments, a hard polymer coating 46 is applied to the drop cable jacket 34 in addition to or in lieu of the armor layer 44. In embodiments, the hard polymer coating 46 includes at least one of nylon, polyether ether ketone (PEEK), phenolic resins, polyetherimide (PEI), acrylates, acetals, etc. The material for the armor layer 44 and/or hard polymer coating 46 is selected based on desired resistance levels, installation environment, flexibility, weight, and/or cost.

Advantageously, by providing each drop cable 14 with an armor layer 44 and/or hard polymer coating 46, the aggregate effect is to also protect the central cable unit 12. That is, the central cable unit 12 does not need its own separate armor layer 44 or hard polymer coating 46 because the drop cables 14 that are wound around the central cable unit 12 combine to provide rodent protection for the central cable unit 12. Further, considerable stiffness in the bundled optical fiber cable 10 is alleviated in this embodiment by through stranding the rodent protection around the central cable unit 12 via the drop cables 14.

FIG. 7 schematically depicts an exemplary deployment for the bundled optical fiber cable 10 or bundled optical fiber cable 10'. For the purposes of discuss, the bundled optical fiber cable 10 will be referenced with respect to FIG. 7. As shown therein, the bundled optical fiber cable 10 supplies information to a telecommunication network 100, such as a 4G or 5G network. In the telecommunication network 100, the central cable unit 12 runs a length L from a first end 12a to a second end 12b. In this way, the central cable unit 12 is an "express fiber" that transports data from node to node in the telecommunication network 100. That is, the central cable unit 12 is not tapped with cable tethers along its length. Instead, the drop cables 14 terminate at various points along length L of the central cable unit 12. As shown, a first drop cable 14a terminates at a first antenna 105a, a second drop cable 14b terminates at a second antenna 105b, and a third drop cable 14c terminates at a third antenna 105c.

In embodiments, each drop cable 14a, 14b, 14c is preconnectorized with, e.g., a multi-fiber push on (MPO) connector, such as an MTP® Connector, a mechanical transfer (MT) connector, such as an OptiTip® Connector, or a single-fiber connector, such as an OptiTap® connector (all available from Corning Incorporated, Corning, N.Y.). In this way, the drop cables 14a, 14b, 14c can easily be connected to a respective connection terminal 110a, 110b, 110c at each antenna 105a, 105b, 105c.

Figure 9:
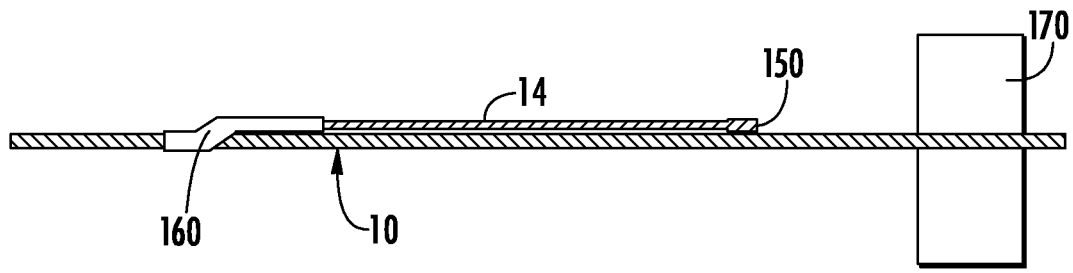
FIG. 9 depicts a drop cable separated from the bundled optical fiber cable at a drop location, according to an exemplary embodiment.

FIG. 9 schematically depicts a drop cable 14 separated from the bundled optical fiber cable 10 at a drop location. As can be seen the drop cable 14 is pre-connectorized with a connector 150. Leading up to the drop location, a length of the drop cable 14 is removed from the drop cables 14 wound around the bundled optical fiber cable 10, and at the location of removal, the drop cable is stabilized with a tap protector 160, which helps prevent the separated drop cable 14 from unwinding from the bundled optical fiber cable 10 more than is desired during the installation process. The connector 150 of the pre-connectorized drop cable 14 is then connected to a tether cable (e.g., FlexNAP™ system cable tether) or a terminal (e.g., OptiSheath™ MultiPort Terminal available from Corning Incorporated, Corning, N.Y.) at a pole 170, e.g., for one of the connection terminals 110a, 110b, 100c as shown in FIG. 7, to provide data transmission.

Referring again to FIG. 7, an electrical grid tap 120 may be provided in embodiments at an antenna, such as antenna 105b. The electrical grid tap 120 provides power to the antenna 105b. In certain embodiments, the ability to provide an electrical grid tap 120 for an antenna may be limited based on the location of the antenna. Advantageously, in embodiments, the bundled optical fiber cable 10 includes one or more electrical drop cables 130 that can be used to connect an electrical grid tap 120 of an antenna, such as antenna 105b, to other antennas in the telecommunication network 100, such as antennas 105a, 105c.

In general, the drop cables 14 have a first end that begins at the first end 12a of the central cable unit 12 (i.e., the first ends of the drop cables 14 and the central cable unit 12 are coterminal), and the drop cables 14 have a second end that terminates before the second end 12b of the central cable unit 12, particularly at a specified tap location. For the rest of the length of the central cable unit 12, a "dummy cable" may be run in place of the terminated drop cable 14 to maintain consistent spacing of the remaining drop cables 14 around the central cable unit 12, to maximize crush performance of the bundled optical fiber cable 10, and/or to maintain a round profile for the bundled optical fiber cable 10, which makes it better suited to encapsulation methods and enhances operability with cable hardware. Thus, the dummy cable is just a length of material containing a low cost filler so as to provide a structure similar in diameter and/or mechanical properties to the drop cables 14. For example, after drop cable 14a reaches the tap point located at antenna 105a, a dummy cable may run in place of the drop cable 14a for the remaining length of the central cable unit 12.

However, in embodiments, an electrical drop cable 130 is used instead of a dummy cable and/or instead of an optical fiber drop cable 14 so that the electrical drop cable 130 can provide electrical communication between various points along the length of the bundled optical fiber cable 10. The electrical drop cable 130 can be any of a variety of suitable cables for transmission of electrical power. In embodiments, the electrical drop cable 130 includes one or more conductive wires, such as copper or aluminum wires, disposed within an electrically insulating jacket material. As shown in FIG. 7, an electrical drop cable 130 is provided after the termination of the first drop cable 14a and after the termination of the second drop cable 14b. One electrical drop cable 130 links the electrical grid tap 120 of antenna 105b to the connection terminal 110a of antenna 105a, and another electrical drop cable 130 links the electrical grid tap 120 of antenna 105b to the connection terminal 110c of antenna 105c. Further, the electrical drop cables 130 provide the same benefits as the dummy cable but also the additional benefit of providing electrical communication or power delivery along the length of the bundled optical fiber cable 10.

As alluded to, in embodiments, the bundled optical fiber cable 10 may include electrical drop cables 130 beginning at the first end 12a of the central cable unit 12 in place of optical fiber drop cables 14, i.e., not just as filler cables after termination of a drop cable 14. In such embodiments, the bundled optical fiber cable 10 may also use electrical drop cables 14 as filler cables. Thus, the bundled optical fiber cable 10 can be designed to provide convenient electrical communication and/or power transmission to a variety of drop locations, including optical fiber drop locations and non-optical fiber drop locations.

As shown in FIG. 7A, electrical drop cables 130 may also begin at the second end 12b of the bundled fiber optic cable 10. In this regard, electrical power may be provided from a central location at second end 12b to coordinate with specific predetermined access points 13 where each of the optical drop cables 14 terminate. In this regard, optical signals may be sourced from a first end 12a of the fiber optic cable 10 and electrical power may be sourced from a second end 12b of the fiber optic cable 10. This bidirectional optical and electrical drop cable arrangement provides for optical and electrical termination at the predetermined locations 13 along the fiber optic cable 10 while maintaining essentially the same cross-sectional footprint. For example, viewing the fiber optic cable 10 from the first end 12a, for example, as an optical fiber drop cable 14a terminates, an electrical drop cable 130a running from the direction of the second end 12b of the fiber optic cable 10 may substantially fill the cross-sectional area that would have been occupied had the optical fiber drop cable 14a continued through toward the second end 12b of the central cable unit 12 beyond the specific predetermined location 13a. Similarly, looking at the fiber optic cable 10 from the second end 12b, for example, as an electrical drop cable 130c terminates, an optical fiber drop cable 14c running from the direction of the first end 12a of the central cable unit 12 may substantially fill the cross-sectional area that would have been occupied had the electrical drop cable 130c continued through toward the first end 12a of the cable 10 beyond the specific predetermined location 13c. Moreover, the cable 10 may comprise combinations of electrical drop cables 130 that start and run from only one end of the cable 10 and/or are provided as shown in FIG. 7, wherein the electrical drop cables 130 may be injected into the cable footprint at discrete locations along the central cable unit 12 to tap into local power at discrete locations along the cable 10.

Each electrical drop cable 130 may comprise a stranded pair of copper conductor wires, for example. One or more of the electrical drop cables 130 may terminate at a predetermined location 13 along the length of the cable 10, depending on the power needs specific to that location. By pre-engineering the cable 10 with power needs in mind, specific gauge conductors may be provided to specific predetermined locations 13. In this regard, the gauge of the twisted pair electrical drop cables 130 may all be the same or may vary in accordance with the specific power needs at a particular location 13. These discrete point-to-point electrical drop cables 130 may be terminated with conventional copper connectors or be left as bare cable ends for field termination. Moreover, a short copper preconnectorized electrical drop cable may be spliced at each specific predetermined location 13 to access a particular electrical drop cable 130. The access point may then be protected with an overmolded enclosure similar to the type described in U.S. Pat. No. 7,127,143, incorporated herein by reference.

As shown in FIG. 7A at predetermined location 13c, the electrical drop cable 130c and fiber optic drop cable 14c may each include an overlap portion 15c and 131c. Overlap portions 15c and 131c may be required to ensure that optical and electrical signals can be received at a discrete distance away from the cable 10 at each predetermined location 13. For example, fiber optic drop cable 14c may have an overlap portion 15c that extends a distance x and electrical drop cable 130c may have an overlap portion 131c that extends a distance y. Distance x and distance y may be substantially equal if desirable to deliver optical and electrical signals to, for example, an optical and power terminal, that is essentially the same point a certain distance x or y away from the cable 10. However, distance x and distance y may be varied if optical signals and power are to be delivered to different points from the cable 10 at the predetermined location 13.

As shown in FIG. 7A, the electrical drop cable 130c may be folded back on itself and secured to the central cable unit 12 with adhesive tape, a heat-shrink sleeve, or any other suitable covering to provide anti-snag capability and protection during manufacture, transport, and install.

In accordance with other aspects of the present disclosure, as shown in FIG. 7B, both the fiber optic drop cables 14 and the electrical drop cables 130 may be in a stranded configuration. At each predetermined location 13, where at least one electrical drop cable 130 and/or at least one optical fiber drop cable 14 are separated from the bundled cable 10, the anti-snag covering 135 may be provided. The covering 135 may be provided to cover all or a portion of the overlaps 15c and 131c, including any connectors provided on the end of the cables 14 and 130. Moreover, as shown in FIG. 7B, the electrical drop cable 130, for example, may be brought back on itself by helical winding in a reverse direction around the perimeter of cable 10. This may avoid subjecting the electrical drop cable 130 to pinching and allow a smaller footprint for the cross-sectional area of the cable 10.

With regard to helically stranding an electrical drop cable 130 into a tapered cable 10 as shown in FIG. 7B, if multiple layers of stranded fiber optic drop cables 14 are provided, introduction of electrical drop cables 130 into each stepped layer must be considered to avoid one or more electrical drop cables 130 preventing easy separation of a fiber optic drop cable 14 from the bundle due to the electrical drop cable 130 being helically wrapped around the entire layer of fiber optic drop cables 14.

Upon reaching the second end 12b of the central cable unit 12, the fibers contained within the central cable unit 12 may be spliced to the optical fibers of another downstream section of bundled optical fiber cable 10. In particular, optical fibers from the central cable unit 12 may be spliced into the optical fibers of a second section of downstream drop cables 14 and into the optical fibers of a second section of a downstream central cable unit 12. In this way, successive bundled optical fiber cable 10 sections may taper in terms of the number of optical fibers contained in the central cable unit 12, including down to zero optical fibers contained in the central cable unit 12. In embodiments with zero optical fibers in the central cable unit 12, the central cable unit 12 may simply contain a strength member (or other filler rod) surrounded with a jacket material to provide a central cable unit 12 of a desired diameter. For example, a first section of bundled optical fiber cable 10 may contain 864 optical fibers in the central cable unit 12. In a second section of the bundled optical fiber cable 10, 432 optical fibers of the 862 optical fibers may be extracted and spliced into drop cables 14 of the second section, and the remaining 432 fibers, for example, may continue in the central cable unit 12 of the second section. This tapering continues until all of the remaining optical fibers of the penultimate section of the bundled optical fiber cable are divided among drop cables 14 in the final section, and these drop cables 14 may be carried by a central cable unit 12 that consists only of a jacketed strength member. While the example considered halving the number of optical fibers between successive sections of a bundled optical fiber cable 10, the number of optical fibers extracted from the central cable unit 12 can vary depending on the needs of a particular application. In general, only so many optical fibers as are needed for a particular section are extracted from the central cable unit 12.

Table 1, below, provides examples of final sections of the bundled optical fiber cable 10 in which the final section of the central cable unit 12 is jacketed strength member. In each of the examples provided, the size of the strength member is the same and only the thickness of the jacket changes to accommodate the number of drop cables. In each embodiment, the drop cables 14 considered are 4.8 mm in diameter and contain from 4 to 12 optical fibers. Going from the 6-Position Cable (i.e., cable with six drop cables 14) to the 10-Position Cable, the number of optical fibers that can be carried goes from as low as 24 to as high as 120; although, not all of the drop cables 14 need to be filled. As can also be seen, the outer diameter of the bundled optical fiber cable 10 for that section goes from 15.0 mm to 21.6 mm as the number of drop cables 14 increase from six to ten.

TABLE 1

Examples of Final Section of Bundled Optical Fiber Cable

|  | 6-Position Cable | 8-Position Cable | 10-Position Cable |
| --- | --- | --- | --- |
| Drop Cables | 6 | 8 | 10 |
| Optical Fibers per Drop Cable | 4 to 12 | 4 to 12 | 4 to 12 |
| Total Optical Fibers | 24 to 72 | 32 to 96 | 40 to 120 |
| Drop Cable diameter (mm) | 4.8 | 4.8 | 4.8 |
| Bundle diameter (mm) | 15.0 | 18.0 | 21.6 |

Embodiments of the bundled optical fiber cable disclosed herein provide certain advantages over existing technology involving cable splicing. In particular, tap points in a network need to be precisely known before a cable can be designed to reach each of the tap points. Because these are specific locations, detailed engineering is required to measure these locations and design the network precisely, which means that cables cannot be made until such designs are submitted to the manufacturer. Where splicing is used to provide tether cables, each tap point along the distribution cable length will need to be marked at the access locations, and then each individual access location will need to have a tether spliced into the distribution cable. This process is time consuming and risky in that, each time this cable is accessed, the risk of cutting the wrong fibers or making a mistake increases. In the presently disclosed bundled optical fiber cable, drop cables are wound around the outside of the central cable unit, avoiding the need to access the cable interior and the associated risk of fiber cuts.

Further, in telecommunication networks, the increased demand for network speed leads to development of a denser network, i.e., a network having more access points and more fiber. In practice, this means that more cables need to be run through fiber ducts. Because the necessary fiber density for a particular development is difficult to predict, it is beneficial to provide express lines in the network. In general, though, the amount of fiber that can be run through a duct is limited. For example, in two inch duct, a limit of 432 fibers was recognized in the industry based on allowable fill ratios for the duct during a pulling or air blowing installation. As disclosed herein, the bundled optical fiber cables provide an express line in such a way that it is feasible to fit fiber counts greater than 432 fibers into two inch duct while maintaining a fill ratio of at most 85% and while also offering a preconnectorized solution. Indeed, in embodiments of the presently disclose bundled optical fiber cable, 864 fibers can run through a two inch duct. In this way, after exhaustion of the drop cables, the express line fibers in the central cable unit can be spliced into the drop cables and central cable unit of a further section of a bundled optical fiber cable if additional demand develops. Further, embodiments of the bundled optical fiber cable are flexible in their design in that the drop cables can be electrical drop cables and/or back filled with electrical drop cables after termination of an optical drop cable.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A telecommunications network comprising:
a plurality of network nodes;
a bundled optical fiber cable, comprising:
a central cable unit spanning a first length from a first end to a second end, the central cable unit comprising a first plurality of optical fibers disposed within a cable jacket, wherein the central cable unit connects two nodes of the plurality of network nodes; and a plurality of optical fiber drop cables wound around the cable jacket of the central cable unit, each optical fiber drop cable spanning a different length from a first end to a second end and having one or more optical fibers disposed within a buffer tube, wherein the second end of each optical fiber drop cable is pre-connectorized with an optical fiber connector;

wherein the first length spanned by the central cable unit is longer than each different length of the plurality of optical fiber drop cables when the first end of each of the plurality of optical fiber drop cables and the first end of the central cable unit are substantially coterminal;

at least one connection terminal, wherein the optical fiber connector of at least one of the optical fiber drop cables is connected to the at least one connection terminal; and a plurality of antennas, wherein at least one optical fiber drop cable of the plurality of optical fiber drop cables terminates at each respective antenna of the plurality of antennas.

2. The telecommunications network of claim 1, wherein each antenna of the plurality of antennas is associated with at least one connection terminal, and wherein the optical fiber connector of each respective optical fiber drop cable is connected to the respective connection terminal.

3. The telecommunications network of claim 1, further comprising at least one tether cable, wherein the optical fiber connector of at least one of the optical fiber drop cables is connected to the at least one tether cable.

4. The telecommunications network of claim 1, wherein the bundled optical fiber cable further comprises one or more electrical drop cables for providing power to at least one antenna of the plurality of antennas.

5. The telecommunications network of claim 1, wherein each optical fiber connector is selected from one of an MPO connector, an MT connector, or a single-fiber connector.

6. A telecommunications network, comprising:

a plurality of network nodes;

a bundled optical fiber cable, comprising:

a central cable unit spanning a first length from a first end to a second end, the central cable unit comprising a first plurality of optical fibers disposed within a cable jacket, wherein the central cable unit connects two nodes of the plurality of network nodes; and a plurality of optical fiber drop cables wound around the cable jacket of the central cable unit, each optical fiber drop cable spanning a different length from a first end to a second end and having one or more optical fibers disposed within a buffer tube; and a drop location where at least one optical fiber drop cable of the plurality of optical fiber drop cables is separated from the bundled optical fiber cable, wherein a tap protector is provided at the drop location to prevent the at least one separated optical fiber drop cable from unwinding from the bundled optical fiber cable, and wherein the first length spanned by the central cable unit is longer than each different length of the plurality of optical fiber drop cables when the first end of each of the plurality of optical fiber drop cables and the first end of the central cable unit are substantially coterminal.

7. The telecommunications network of claim 1, wherein the first plurality of optical fibers of the central cable unit are arranged in a stack of ribbons.

8. The telecommunications network of claim 7, wherein the stack of ribbons comprises a first stack section, a second stack section, and a third stack section disposed between the first stack section and the third stack section, wherein the first stack section and the second stack section contain the same number of optical fibers, and wherein the third stack section contains more than the first stack section and the second section.

9. The telecommunications network of claim 1, wherein the first plurality of optical fibers is at least 288 optical fibers.

10. The telecommunications network of claim 1, wherein each optical fiber drop cable of the plurality optical fiber drop cables further comprises a drop cable jacket.

11. The telecommunications network of claim 10, wherein each optical fiber drop cable of the plurality optical fiber drop cables further comprises an armor layer between the buffer tube and the drop cable jacket.

12. The telecommunications network of claim 10, wherein each optical fiber drop cable of the plurality optical fiber drop cables further comprises a hard polymer coating disposed around the drop cable jacket, wherein the hard polymer coating comprises at least one of nylon, polyether ether ketone, phenolic resins, polyetherimide, an acrylate, or an acetal.

13. The telecommunications network of claim 1, wherein each optical fiber drop cable of the plurality optical fiber drop cables comprises up to thirty-six optical fibers.

14. The telecommunications network of claim 1, wherein the bundled optical fiber cable comprises up to twenty-four optical fiber drop cables.

15. The telecommunications network of claim 1, wherein the one or more optical fibers of each drop cable of the plurality of drop cables are arranged in a rollable ribbon.

16. The telecommunications network of claim 1, further comprising bands placed at various intervals along the bundled optical fiber cable to keep the plurality of drop cables wrapped around the central cable unit.

17. The telecommunications network of claim 1, further comprising webbing provided around the plurality of drop cables to keep the plurality of drop cables wrapped around the central cable unit.

* * * * *